July 6, 1937.  F. LJUNGSTROM  2,085,810
COOLING OF INTERNAL COMBUSTION ENGINES
Filed March 17, 1933   5 Sheets-Sheet 1

INVENTOR
Fredrik Ljungstrom
BY
ATTORNEY

July 6, 1937. F. LJUNGSTROM 2,085,810
COOLING OF INTERNAL COMBUSTION ENGINES
Filed March 17, 1933 5 Sheets-Sheet 2

INVENTOR
Fredrik Ljungstrom
BY
his ATTORNEY

July 6, 1937.  F. LJUNGSTROM  2,085,810
COOLING OF INTERNAL COMBUSTION ENGINES
Filed March 17, 1933   5 Sheets-Sheet 5

INVENTOR
Fredrik Ljungstrom
BY
his ATTORNEY

Patented July 6, 1937

2,085,810

UNITED STATES PATENT OFFICE 2,085,810

COOLING OF INTERNAL COMBUSTION ENGINES

Fredrik Ljungström, Lidingo, Sweden, assignor to Aktiebolaget Spontan, Stockholm, Sweden, a corporation of Sweden Application March 17, 1933, Serial No. 661,250
In Germany June 20, 1932

30 Claims. (Cl. 123—170)

The present invention relates to cooling of internal combustion engines and refers particularly to cooling of internal combustion engines by means of oil or like fluids of relatively high boiling point and low freezing point, as compared with the boiling and freezing points of water. More specifically, the invention relates to oil cooling systems for internal combustion engines of the type in which oil is circulated in a closed path of flow, absorbing heat from the parts of the engine requiring cooling and giving up its heat to cooling air passing over a surface type radiator or cooler through which the oil flows.

In the practical development of the art of cooling internal combustion engines, cooling systems, other than those employing direct air cooling, have been limited substantially entirely to systems employing water as the cooling fluid. Water, as a cooling fluid, has a number of serious disadvantages, among which are the limitation of the temperature of the cooling medium to the boiling point of water, that is, 100° C.; the danger of freezing of the cooling fluid in cold weather, the formation of rust and scale deposits in the water passages, thus impairing the rate of heat transfer and the consequent cooling effect; and the danger of leakage of water from the cooling system to parts of the engine containing the lubricating oil therefor.

On the other hand, the use of oil as a cooling fluid avoids the above enumerated disadvantages of water. It also provides numerous advantages, such for example as the possibility of operating the engine at relatively high temperatures, which is not only productive of better efficiency but which also prevents dilution of the lubricating oil due to condensation of fuel on relatively cold cylinder walls. Since the viscosity of oil increases rapidly with decreasing temperature, oil as a cooling medium provides the further advantage of automatic temperature control since the cooling effect varies with variations in engine temperature and consequent variations in viscosity of the oil. This is of particular advantage when starting a cold engine which, due to the high viscosity of cold oil and the consequent relatively low rate of cooling, rapidly warms up to its normal operating temperature.

Further advantages are obtained if the same oil is used in the cooling system as is used in the lubricating system for the engine. When this is done a certain amount of leakage of fluid from the cooling system to the lubricating system is not objectionable and this makes possible and facilitates the use of separable inserted cylinder liners with the known advantages thereof, such for example as the possibility of making the cylinder liners of specially hard material while employing lighter and softer metal for the main cylinder casting. Also when using lubricating oil as the cooling medium, it is possible to provide a common reservoir for both systems so that servicing of the engine is simplified to the extent of having to supply but a single fluid thereto for both cooling and lubricating.

In spite of the known disadvantages of water as a cooling medium and the advantages of oil as a cooling medium, oil cooling systems as heretofore proposed have not been practically successful. This is probably due largely to the attempts heretofore made to utilize oil in cooling systems designed along lines similar to the conventional water cooling systems. In such systems oil, due to its smaller specific heat and higher viscosity as compared to water, does not provide sufficient cooling effect and also does not provide for the particularly efficient cooling effect of the most highly heated or overheated parts of the engine which is at times provided by water due to generation of steam with the resultant high rate of heat absorption at the place where steam is generated.

The general object of the present invention is to provide a novel oil cooling system which differs materially from the conventional type of cooling system designed for water as a cooling medium and which provides fully adequate cooling of an engine with the use of a cooling medium having as low a specific heat and as high a viscosity as that of oil. Stated broadly, the desired results are obtained in accordance with the present invention by conducting the cooling oil over the parts of the engine to be cooled at relatively high velocities and in the form of a relatively thin film. This manner of circulating the cooling medium is productive of excellent cooling effect and, moreover, may be effected with only a moderate power requirement for circulation of the cooling fluid, as will hereinafter be more fully explained.

The invention has as a further general object the provision of novel forms of engine construction whereby passages for circulation of oil in thin films around the engine parts to be cooled are provided in a simple and practical manner. The more detailed nature of the invention, together with the manner in which the above and other objects thereof are attained, may best be understood from a consideration of the ensuing description of suitable forms of apparatus for carrying the invention into effect, taken in conjunction with the accompanying drawings forming a part of this specification.

Figures 1, 2, 3:
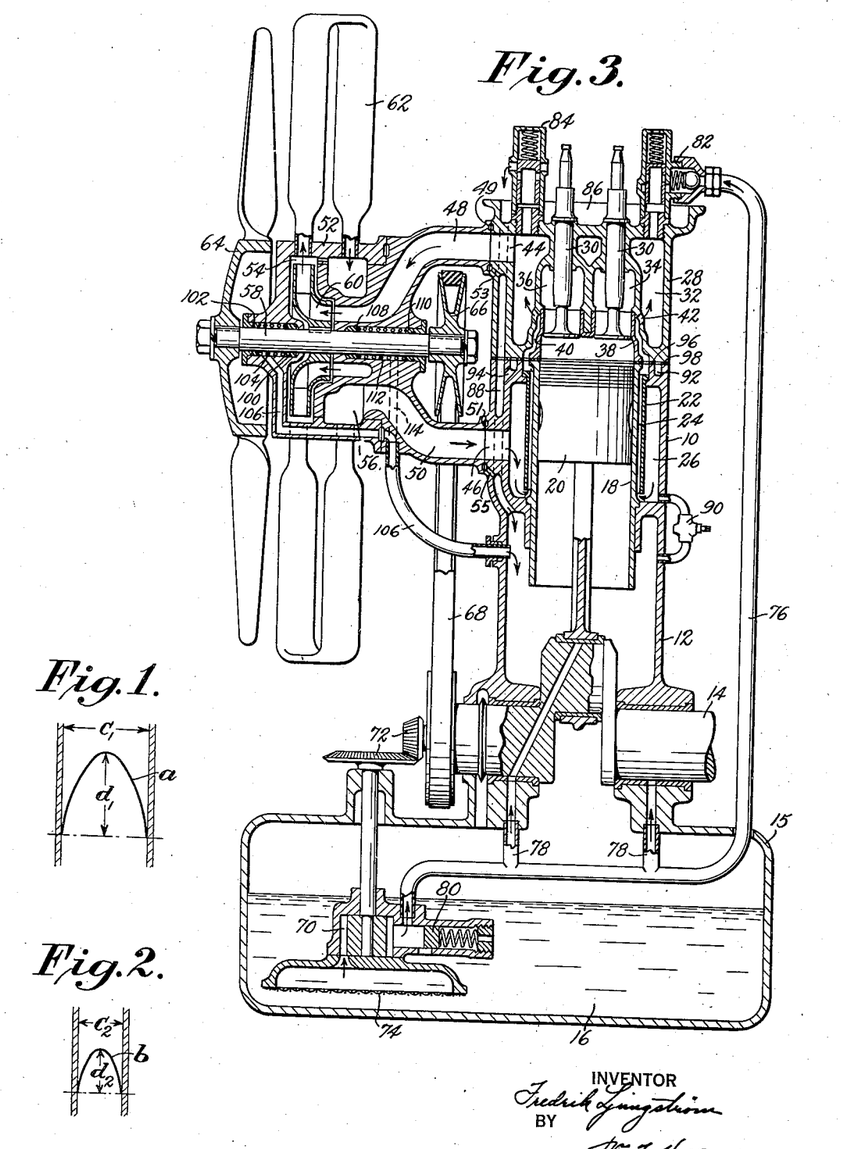
Figs. 1 and 2 are diagrams illustrating certain characteristics of flow of cooling fluid in cooling passages.
Fig. 3 is a more or less diagrammatic sectional view of a single cylinder internal combustion engine having an oil cooling system embodying the present invention, certain parts being shown in elevation.

As above stated, the cooling of the engine parts in accordance with the present invention by circulating oil over such parts at relatively high velocity and in the form of relatively thin films enables effective cooling to be obtained without requiring more than a moderate amount of power for circulation of the cooling fluid. The reason for this may be readily explained in connection with the diagrams of Figs. 1 and 2, which indicate by means of the curves $a$ and $b$, respectively, the velocity of flow of oil between parallel walls defining channels having widths of $c_1$ and $c_2$, respectively. In the diagrams, the velocity of the oil in any part of the channels is represented by the distance from the curves to the planes indicated by broken lines and extending transversely of the passages. In Fig. 1, the oil velocity at the center of the passage is indicated by the distance $d_1$ and in Fig. 2 the corresponding velocity is indicated by the distance $d_2$. If it is assumed that the distance $c_1$ and the velocity $d_1$ in Fig. 1 are twice the value of the distance $c_2$ and velocity $d_2$ in Fig. 2, the form of the curves $a$ and $b$ representing the character of the oil velocity over the cross-sections of the passages will be of the same character. Since the tangents to these curves at the inner surfaces of the walls determine the rate of heat transfer from the walls to the oil, the same rate of heat transfer is obtained in both instances. If we now consider the power required to circulate the oil, we find that in the channel indicated in Fig. 1, the rate of oil flow is four times as great as is the rate of oil flow in the channel shown in Fig. 2 since both the cross-sectional area and the velocity of oil flow are twice as great in Fig. 1 as in Fig. 2. On the other hand, the pressure drop through equal lengths of the two channels is only half as great in the case of Fig. 1 as in the case of Fig. 2. The power required to circulate oil, measured by the product of the rate of oil flow and the pressure drop, is therefore twice as great with the arrangement shown in Fig. 1 as with the arrangement shown in Fig. 2. From this it follows, that for equal cooling effect, the power required for circulation of cooling oil increases in direct proportion with the increase in thickness of the oil film or, in other words, with the increase in the dimension of the cooling jacket space as represented by $c_1$ and $c_2$ in Figs. 1 and 2, respectively.

I have found from calculations, test and experiment that the best practical results in cooling internal combustion engines by means of oil are obtained when the oil is circulated over the parts to be cooled at velocities of from five to twenty feet per second and in relatively thin films of from $\frac{1}{32}$ to $\frac{1}{8}$ of an inch in thickness.

The provision of cooling jacket spaces for the circulation of oil in films of the thickness stated above is obviously impractical with integral cast cylinder blocks and in accordance with the present invention, the jacket spaces providing for the thin oil films are obtained by constructing the engine so that the passage walls of the different jacket spaces are each formed by different engine parts. This construction makes it possible to obtain jacket spaces providing for oil films of substantially any desired thickness and also provides the further advantage that the parts forming the walls of the jacket spaces may be machined so that smooth and clean surfaces are provided in the channels through which the oil flows, thus improving the rate of heat transfer to the oil and minimizing the amount of power required to circulate the oil. It is evident that by proper selection of the dimensions of the jacket passages, the thickness of the oil film, and consequently the cooling effect, may be adapted to suit the requirements of cooling for the various parts of the engine and by having the jacket spaces defined by walls comprising different engine parts, the construction of the jacket spaces to substantially the exact dimensions desired is facilitated. In this connection, in accordance with the present invention, the oil for cooling any one cylinder is preferably caused to flow serially over the several cylinder parts such as the barrel of the cylinder, the cylinder head, the exhaust gas channel etc., the several jacket spaces around these parts being made so as to obtain different velocities of flow of the oil over the several cylinder parts in accordance with the cooling requirements of the different parts.

In the case of multi-cylinder engines, the several cylinders are preferably connected in parallel with respect to the flow of cooling oil, so as to obtain uniform cooling of the different cylinders.

Turning now to Fig. 3, one form of construction for carrying the invention into effect is more or less diagrammatically illustrated. In the embodiment shown, the engine comprises an outer cylinder casing 10 which also forms the crank case 12 housing the crank shaft 14 and comprising the oil reservoir or sump 16. Inserted in a suitable guide in the casing 10 is a liner 18 forming the barrel of the engine cylinder in which the piston 20 reciprocates. Also inserted in the outer cylinder casing 10 is the sleeve 22 spaced from the outer surface of the liner 18 to provide a cooling jacket space 24 in communication at the bottom of sleeve 22 with the relatively large space 26 between the outer casing 10 and sleeve 22.

As will be seen from the figure, the jacket space 24 provides for flow of only a relatively thin film of cooling fluid between sleeve 22 and the liner 18.

The cylinder head in the present embodiment is separable from the lower portion of the cylinder structure and comprises an outer casing 28 having guides formed therein for the stems of the valves 30 and providing a relatively large chamber 32 surrounding the passages 34 and 36 for the admission to and exhaust of gases from the cylinder.

Seated in the outer casing 28 is the separable cylinder or combustion chamber head 38 which provides seats for the heads of the valves 30. As will be observed from the figure, the outer surface of the part 38 is similar in contour to the inner surface of the lower portion of the outer casing 28 so as to provide a narrow jacket space 40 in the cylinder head for circulation of a comparatively thin film of oil around the part 38. The lower part of the jacket space 40 registers with the upper end of the jacket space 24 and the upper portion of the jacket space 40 is placed in communication with the space 32 by means of a plurality of ports 42.

Spaces 32 and 26 are placed in communication, respectively, by the openings 44 and 46 with conduits 48 and 50 leading to the radiator of the cooling system. In the embodiment illustrated, the radiator comprises a central casing 52 providing an inlet chamber 54 with which conduit 48 is in communication and an outlet chamber 56 with which conduit 50 is in communication. Extending centrally through the chambers is the shaft 58 upon which is mounted the circulating pump impeller 60 situated in chamber 54. Chambers 54 and 56 are connected by a plurality of outwardly extending bent pipes 62 which serve as the cooling elements of the radiator.

Shaft 58 extends through both end walls of the central radiator casing and one projecting end has mounted thereon the cooling fan 64 having blades adapted to force air over the tubes 62. The other projecting end of shaft 58 has mounted thereon a driving pulley 66 driven by belt 68 from the engine crank shaft 14.

It will be noted that the unitary assembly of radiator, cooling fan, circulating pump and driving means for the fan and pump is attached to the engine and supported by the conduits 48 and 50 and is removable from the engine as a unit. The general form and arrangement of these elements of the cooling system and the specific construction of the radiator form no part of the present invention, this structure being described and claimed in my copending application Serial No. 661,251 filed March 17, 1933, now Patent Number 1,980,811.

In accordance with the present invention, the cooling oil is preferably circulated under pressure and in the embodiment illustrated, the circulation of the cooling fluid under pressure is obtained by utilization of pressure derived from the pump for circulating lubricating oil to the several parts of the engine requiring lubrication. In the embodiment shown, the pump 70 for circulating lubricating oil is of the usual gear type located in the engine base or sump and driven through suitable gears 72 from the engine crank shaft. Pump 70 draws oil from the sump, preferably through a filtering screen 74 and discharges oil under pressure through the conduit 76 having branches 78 leading to the engine bearings and other parts to which lubricating oil is circulated under pressure. A pressure relief valve 80, the overflow from which communicates with the engine sump, provides for relief of excess oil pressure in the delivery line from the pump.

Conduit 76 communicates with the chamber 32 in the cylinder head by way of a combined check and reduced pressure valve indicated generally at 82, the detailed nature and function of which will be described later.

Excess pressure in the cooling system is relieved by way of a pressure relief valve 84, the detailed nature and functioning of which will also be described later.

Oil overflowing from valve 84 is caught in the depression 86 formed in the top of the cylinder head and from this depression flows through the passage 88 in the outer cylinder parts 28 and 10 to the oil sump provided in the crank case. Any oil which may escape from valve 82 is also caught in the depression 86 and returned to the sump through the passage 88.

Preferably a valve connection 90 is provided for draining the contents of the oil spaces in the cylinder structure to the sump in the lower part of the crank case.

It is difficult to maintain oil under pressure without leakage at the joints between separable parts conducting the oil under pressure and in order to eliminate leakage of oil in the present system to the external parts of the engine, the several separable parts providing channels for flow of oil are formed so as to provide double spaced joints therebetween with drains situated between the spaced joints. In the embodiment illustrated, the upper face of the outer cylinder member 10 is provided with a groove 92 extending around the cylinder, this groove being in communication with the drain passage 88 by means of port 94. This arrangement, as will be clear from the figure, provides two spaced joints 96 and 98 between the outer lower cylinder member 10 and the outer upper cylinder head member 28. The inner joint 96 is subject to the pressure of the oil in the jacket space and the outer joint is free from pressure because of the intermediate pressure relief channel provided by groove 92 and passage 88 for the return to the engine sump of any oil which may leak past the inner joint 96.

All joints in the system are preferably made in accordance with the above described principle and as illustrated in the figure, the flanged ends of the conduits 48 and 50 and the corresponding flanges on the cylinder parts are provided with double spaced joints 49 and 51 having intermediate pressure relief channels 53 and 55, respectively between them. Gaskets of any suitable form may be employed for sealing the joints, but it is to be noted that with double joints of the type described, satisfactorily tight seals may be maintained in some instances without gaskets by suitably grinding the metal joint faces to proper accuracy.

The pump shaft 58 is likewise packed against leakage in accordance with the same principle as that above described. In the arrangement illustrated, the projecting end of the shaft which carries the fan 64 is provided with a stuffing box comprising an inner packing 100 and an outer packing 102 axially spaced therefrom. A spring 104 is preferably interposed between these spaced packings to provide the desired amount of pressure on them and the space between the packings is connected by means of the drain pipe 106 to the engine crank case.

The opposite projecting end of shaft 58, carrying the pulley 66, is likewise packed by spaced packings 108 and 110 between which is disposed the spring 112. The space between these latter packings is connected to the drain conduit 106 by the conduit 114.

The operation of the apparatus just described is largely obvious.

Assuming the cooling system to be filled with oil, operation of the engine causes oil to be pumped through the cooling tubes of the radiator from which it passes by way of chamber 56 and conduit 50 to the chamber 26 in the cylinder structure. From chamber 26 the oil flows upwardly in the jacket space 24 between the cylinder liner 18 and sleeve 22 and then passes through jacket space 40 over the inner cylinder head or combustion chamber member, flowing through ports 42 to the chamber 32 and while in the latter chamber cooling the walls of the gas inlet and exhaust passages 34 and 36. From chamber 32, the oil flows through conduit 48 to the suction side of the pump member 60, thus completing its cycle of circulation. Leakage of oil from the system at any of the joints is returned through the drain passages to the sump and leakage from the cooling system is replaced with oil supplied under pressure by pump 70 through the conduit 76.

In the arrangement shown, numerous important advantages are obtained, the most important of which will now be pointed out.

It will be noted that the flow of cooling oil over the several parts of the cylinder structure requiring cooling, such for example as the cylinder barrel, the head of the cylinder and the inlet and exhaust passages for gas is serial with respect to these parts. By this arrangement, the velocity of the oil can be made different in different parts of its path of flow and the rate of cooling may thus be varied in accordance with the requirements for cooling of the several parts of the cylinder structure. Due to the fact that the parts defining the walls of the jacket spaces are formed by different engine parts, the jacket spaces may be accurately formed, since the surfaces of the jacket walls may be machined before the several parts are assembled. Thus, the velocity of flow of oil over the various cylinder parts may be accurately predetermined and, due to the possibility of providing smooth wall surfaces, rapid and uniform rates of heat transfer to the oil may be insured Because of the utilization of separate parts or inserts, such as the cylinder liner 18 and the separable head 38, special materials may be used for these parts without involving undue cost and by the use of special materials the walls through which the major portion of the heat must be transmitted may be made relatively thin, thus aiding the desired rapid rate of heat transmission. The relatively simple nature of the inner cylinder head part 38 permits this part to comprise not only the walls of the combustion chamber but also parts of the gas inlet and exhaust passages, which extend beyond the valve seats and seat against the outer cylinder head part at a point beyond the heads of the valves. This permits the joints in the gas passages to be made in zones not subjected to any substantial gas pressure and the construction also permits of making the valve seats integral with the part 38, since this entire part is relatively small and the amount of material required for it does not prohibit the use of the more expensive material required for the best type of valve seat. This arrangement offers distinct advantages over the alternative practice, now frequently employed, of employing separable valve seats, particularly for the exhaust valve, since with separable valve seats a greater thickness of metal is required and the rate of heat transfer is retarded because of the joint between the separable valve seat and the cylinder part in which it is located. The exhaust valve seat and the area adjacent thereto requires most efficient cooling and the present arrangement provides for this by enabling a thin walled structure to be employed, which may also, within reasonble costs, be of a material best suited for the purpose.

Figure 4:
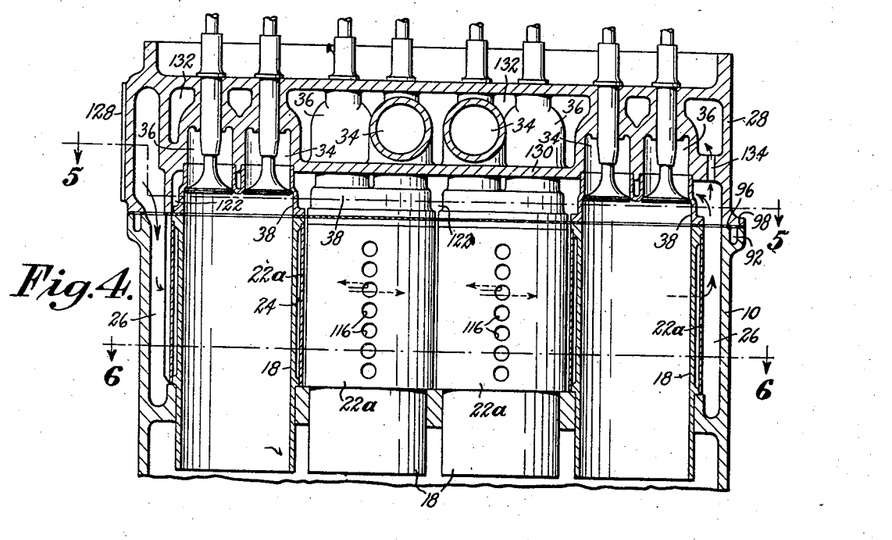
Fig. 4 is a vertical central section with certain parts shown in elevation of a cylinder block for a four cylinder engine embodying the invention.
Figure 5:
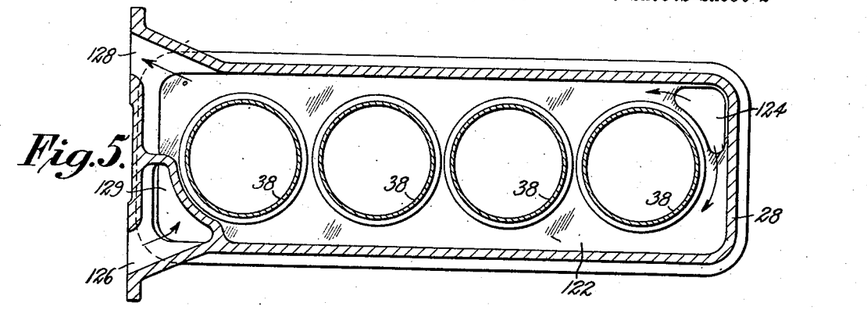
Fig. 5 is a cross-section taken on the line 5—5 of Fig. 4.
Figure 6:
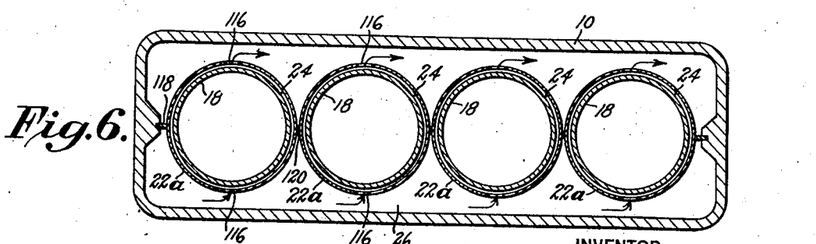
Fig. 6 is a cross-section taken on the line 6—6 of Fig. 4.

Turning now more particularly to Figs. 4 to 6, there is shown a cylinder arrangement for a four cylinder engine embodying a cooling system in accordance with the present invention. In this construction the outer cylinder casing 10 is in the form of a cylinder block for the entire group of cylinder barrels which are formed by the liners 18 seated in suitable bores in the casing 10. The jacket spaces 24 around the liners 18 are formed by the sleeves 22a which, in this embodiment, are in contact with the liners 18 both at the top and bottom of the sleeves. As may be seen more clearly from Fig. 6, the outer casing 10 provides a large outer chamber 26 for oil and the several cylinder jacket spaces 24 are placed in communication with this chamber on opposite sides of the cylinders by means of a series of holes or ports 116 in sleeves 22a. The spaces between the sleeves 22a of the end cylinders and the ends of the casing 10 are preferably closed by partition plates 118 or other suitable means and the spaces, if any, between adjacent sleeves 22a are closed as indicated at 120. This arrangement divides the chamber 26 into two parts which are placed in communication by way of the jacket spaces 24. These jacket spaces are in parallel with respect to flow of oil therethrough, the oil flow through the chamber 26 and the jacket spaces being as indicated by the arrows in Fig. 6.

The cylinder head arrangement comprises an outer casing 28 in which are integrally formed portions of the gas inlet and exhaust passages 34 and 36. The separable inner cylinder or combustion chamber heads 38 are seated in the outer head casing 28 in a manner similar to that indicated in Fig. 1 so as to provide a common jacket space 122 around these heads, the outer wall of this space being defined by the wall of the outer head casing 28. Oil passes from the outer chamber 26 in the casing 10 to space 122 in the head 28 by way of port 124 formed in the usual gasket located between the cylinder barrel portion and the cylinder head portion of the structure. In the present form of construction both the inlet opening 126 for oil and the outlet 128 are formed in the outer head casing 28, as indicated in Fig. 5 and oil flows downwardly from the inlet opening 126 through port 129 to the outer chamber 26 in the lower cylinder casing. The direction of oil flow through the cylinder block is, as indicated by the arrows in the figures, downwardly from the inlet 126 to chamber 26, then in parallel in a plurality of separate streams through the jacket spaces 24, then upwardly through port 124 to the jacket space 122 in the head and serially through this space around the cylinder head members 38 to the outlet 128. In this arrangement, the serial flow of the cooling oil over the cylinder head members is at relatively high velocity and good cooling effect is obtained in spite of relatively large flow areas in the space 122. In the preferred form of the invention, however, flow of cooling oil over the head portions as well as the barrels of the cylinders is in parallel with respect to the different cylinders.

The jacket space 122 around the inner cylinder heads is divided by a wall 130 from an upper jacket space 132 surrounding the portions of the inlet and exhaust gas passages which are formed integrally with the head casing 28 and also around the valve guides in this casing part. For cooling these parts of the head, which require cooling at a less rapid rate, oil flows to space 132 by way of the passage 134. A relatively small quantity of oil flows through passage 134, which is, however, sufficient to effect the necessary cooling. Outlet 128 communicates with space 132 as well as space 122.

The outer cylinder casing 10 is formed as shown in Fig. 4 with a groove 92 providing spaced joints 96 and 98 between the part 10 and the outer head casing 28. Groove 92 communicates with a drain passage, not shown.

From inspection of Figs. 4 to 6, it will be evident that, with the arrangement illustrated, all joints involving the possible leakage of oil to the exterior of the engine are avoided except the joint between the lower cylinder casing and the upper or head casing and the joints at the inlet and outlet openings 126 and 128. This avoidance of a large number of joints is accomplished in spite of the fact that separate flow to each of the cylinder barrels is provided and the distribution of the cooling oil over the surfaces to be cooled is accurately controlled. This is an important advantage in a system of the character under discussion since, as previously stated, it is relatively difficult to maintain fluid-tight joints for retaining oil under pressure and the relatively few joints involved in the present arrangement is a factor of material practical importance in oil cooling systems.

Figures 7, 8, 9, 10, 11:
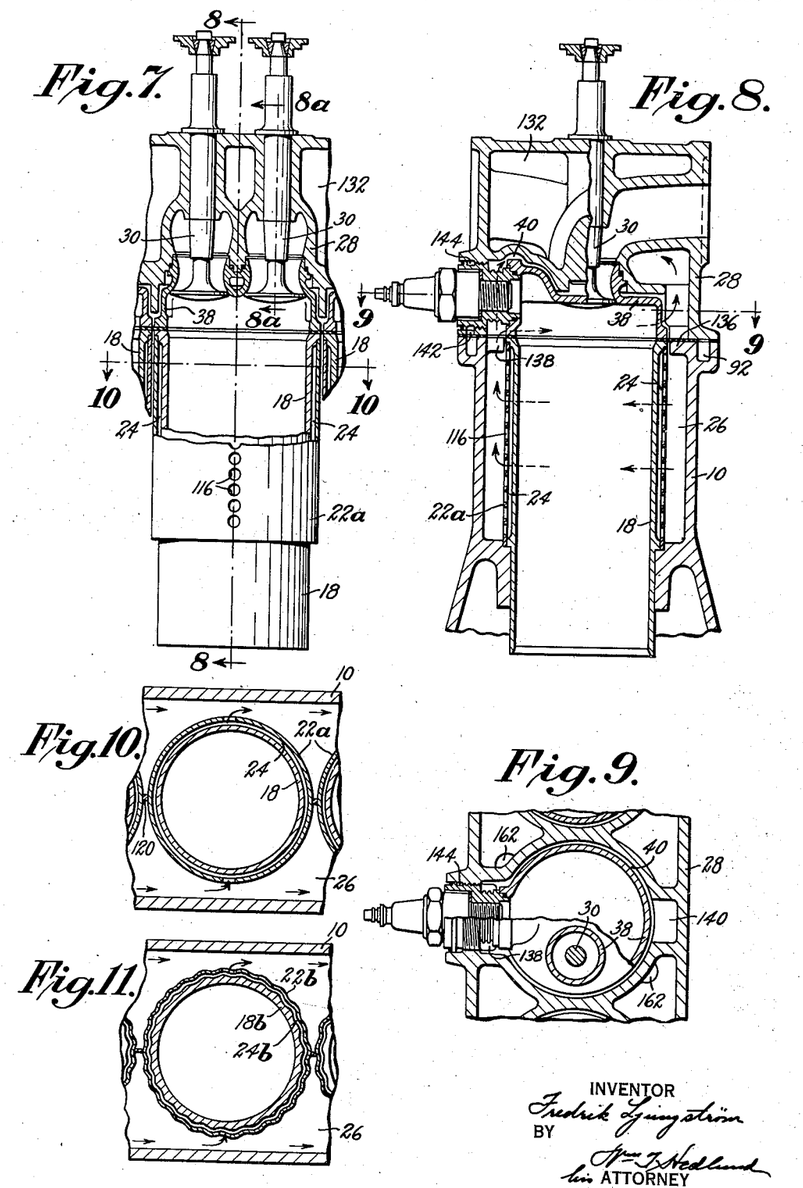
Fig. 7 is a side elevation, parts being broken away and shown in central section, of a cylinder of an overhead valve engine embodying the invention.
Fig. 8 is a section taken in part on the line 8—8 of Fig. 7 and taken in part on the line 8a—8a of Fig. 7.
Fig. 9 is a section taken generally along the line 9—9 of Fig. 8, portions of certain parts being shown in plan view.
Fig. 10 is a section taken on the line 10—10 of Fig. 7.
Fig. 11 is a section showing a variation of the construction shown in Fig. 10.

In Figs. 7 to 10 another arrangement for a multi-cylinder engine is shown in which arrangement the circulation of oil around the cylinder head members is in parallel with respect to the different cylinders, as well as the flow around the barrel portions of the cylinders. In this construction the lower cylinder casing 10 has mounted therein a plurality of cylinder liners 18 which are in turn surrounded by sleeves 22a having ports 116 for connecting opposite sides of the outer chamber 26 by way of the jacket spaces 24. Chamber 26, as in the form shown in Fig. 6, is divided into inlet and discharge sides by means of suitable partition members 120 or equivalent means between adjacent sleeves 22a, and the inlet side of the chamber 26 is closed at the top by means of the flange 136. On the outlet side of the chamber a series of ports 138 are provided, which ports provide for flow of oil to the head portion of the cylinder structure. The head portion of the cylinder structure comprises the outer casing 28 in which are seated the inner cylinder head members 38 and, as will be observed from Figs. 8 and 9, the outer casing 28 is formed with internal webs providing individual jacket spaces 40 around each cylinder head. As is shown in Fig. 8, jacket spaces 40 are in communication with the ports 138 in the lower casing 10 at one side of the cylinders and at the opposite side ports 140 provide for the discharge of oil from spaces 40 to the upper jacket space 132 in the casing 28.

The inner cylinder head members 38, as shown in Figs. 8 and 9, have suitable openings therein in which separable spark plug bushings 142 are seated, these bushings preferably being screwed into openings in the outer casing 28 which register with the openings in the inner heads 38. As shown in Fig. 8, these bushings are screwed into the casing 28 and are grooved at 144 to provide a double joint between the bushings and the casing. The grooves 144 in the several bushings are in communication with the groove 92 providing the usual double joint between the casing parts 10 and 28.

In this arrangement, oil is admitted to the lower casing chamber 26, flows around the several cylinders in parallel through the jacket spaces 24 and then flows in parallel over the several combustion heads through the jacket spaces 40 from which it is discharged to the upper jacket space 132 with which the outlet connection from the cylinder block is in communication. In this arrangement, it will be evident that the flow of cooling oil is in parallel with respect to the entire cylinder structure of the different cylinders and with respect to each individual cylinder the flow is in series over the parts to be cooled.

In some instances it may be desirable to provide for an increased rate of heat transfer from the parts to be cooled to the cooling oil and the rate of heat transfer may be increased by causing increased turbulence of flow of oil over the heat delivering surfaces. In Fig. 11 there is shown one arrangement by means of which increased turbulence of flow may be secured. In this arrangement sleeves 22b are corrugated and the outer surface of the cylinder liners 18b are also corrugated. Obviously, only one of the walls defining the jacket space 24b may be corrugated, and other means may be employed for effecting turbulent flow.

Figure 12:
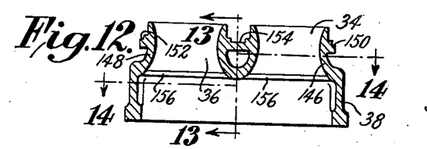
Fig. 12 is a cross-section, on enlarged scale, of a part of the arrangement shown in Figs. 7 to 10.
Figure 13:
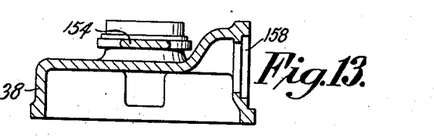
Fig. 13 is a section taken on the line 13—13 of Fig. 12.
Figure 14:
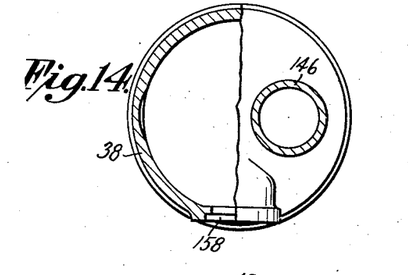
Fig. 14 is a view taken on the line 14—14 of Fig. 12.

Figs. 12 to 14 illustrate features of construction of the heads 38 shown in Figs. 7 to 9 which enable particularly effective cooling of the combustion chamber portion of the cylinders to be obtained. As previously pointed out, the members 38 have formed as integral parts thereof the adjacent portions of the gas inlet and outlet passages 34 and 36. These portions are formed respectively by the separate cylindrical thin walled branches 146 and 148 reenforced by the flanges 150 and 152. Flanges 150 and 152 are adapted to retain suitable gaskets for effecting a seal between the separable heads 38 and the outer head casing 28. Flanges 150 and 152 are connected, as shown in Figs. 12 and 13 by means of a web 154. This web 154 serves to strengthen the structure and as a result the walls may be made of minimum thickness, thereby insuring maximum rate of heat transfer through the walls. This is particularly important in the zone of the valve seats 156, where the most efficient cooling possible is of great importance. In connection with this particular part of the engine structure, it should be particularly observed that the joints formed at the flanges 150 and 152 between the inner and outer cylinder head parts are subject neither to the direct radiation of heat from the combustion chamber nor to the combustion chamber pressure. Because of this it is possible to obtain joints at these points which will remain tight and avoid leakage of oil from the cooling system to the combustion chamber or to the gas passages leading to and from the cylinder. The opening 158 provides a suitable seat for the spark plug bushing 142 shown in Fig. 8.

As will be evident from the figures, the parts 38, when made as above described, are relatively small and simple in form and it is therefore possible to cast these parts with great accuracy so that when they are in assembled position uniform cooling jacket spaces surrounding these parts will be obtained. It will also be apparent that the amount of material required for these parts is such that high grade material may be employed without involving undue cost, thus making it possible to provide long wearing valve seats without having to resort to separate valve seat rings.

In the forms of apparatus previously described, the inner cylinder head members have been shown as being retained in position by being compressed between the cylinder liners and the outer head casing 28 and, in such arrangements, the several inner cylinder head parts are immediately removable from the outer casing upon removal of the head casing from the lower cylinder casing and removal of the valve springs to permit withdrawal of the valves.

Figure 15:
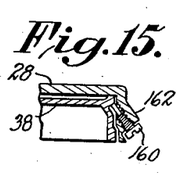
Figs. 15 and 16 are sections illustrating other forms of details of construction.
Figure 16:
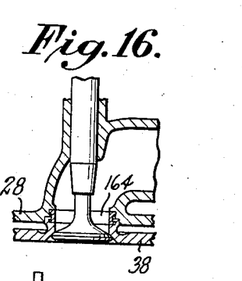

In Figs. 15 and 16 are shown means whereby the inner cylinder heads may be fixed in the outer head casing 28. In Fig. 15, the part 38 is retained in position in the outer head casing 28 by means of screws 160, one of which is shown in the figure. Preferably two diametrically opposed screws are used for each cylinder head, these screws being threaded in suitable lugs 162 cast in the outer head 28 in the positions indicated in Fig. 9.

In the arrangement shown in Fig. 16, the branches for the gas inlet and exhaust passages are grooved instead of being flanged, as shown in Fig. 12, and the branches are fixed to the parts of the outer head casing 28 in which they seat by means of rings 164, one of which is shown in Fig. 16, rolled into these grooves and suitable grooves in the part 28. This arrangement provides a more or less permanent connection between the parts 38 and part 28.

Figs. 17 to 21 illustrate the application of the invention to an engine of the L-head or side valve type. In this arrangement the lower outer casing 10a has seated therein separable liners 18a, the barrel portions of which are surrounded by the sleeves 22a to provide the jacket spaces 24 around the cylinder barrels, the latter communicating with the outer oil chamber 26. In this type of engine the gas inlet and exhaust passages 34a and 36a are formed in the lower casing 10a rather than in the cylinder head casing and the liners 18a in addition to the usual barrel portion are formed with laterally projecting flanges 166 at their upper ends from which depend the branches forming parts of the inlet and exhaust passages, one of these branches being indicated at 146a in Fig. 20. These branches are provided with flanges corresponding in function to the flanges 150 and 152 shown in Fig. 16 and are adapted to retain gaskets for providing a tight joint between the liners and the walls of the gas passages in the outer casing 10a. As will be observed from Fig. 20, these joints are beyond the valve seats 156 and are consequently not subjected either to direct radiant heat or to combustion chamber pressure. The tops of the combustion chambers are formed by the head casing 38a, having a separable cover 38b. Parts 38a and 38b provide an oil chamber 32 in the head of the cylinder structure and individual cooling jacket spaces 40 are formed around the several inner cylinder heads by means of a number of plates 168 and 170 inserted in the part 38a. These plates are preferably formed of sheet metal and are shaped so as to provide jacket spaces 40 which will cause the cooling oil to be circulated over the heads of the cylinders in the form of thin films.

Figure 17:
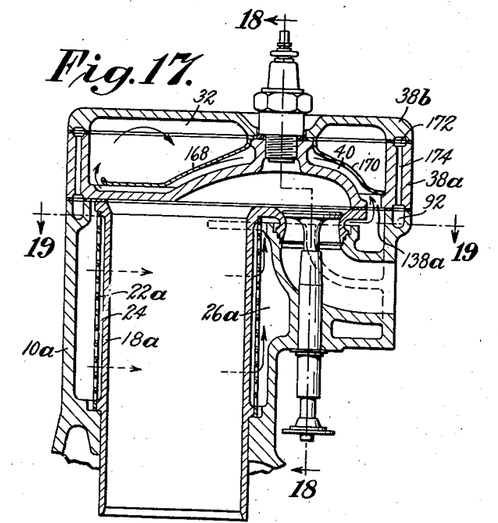
Fig. 17 is a central section of a cylinder of an internal combustion engine with side valves constructed in accordance with the invention.
Figure 19:
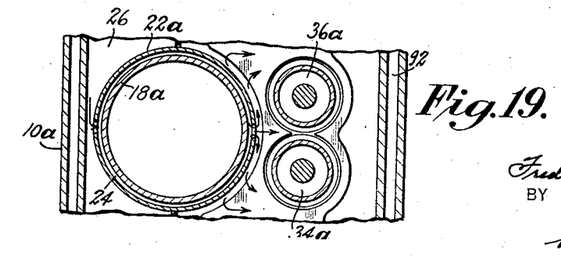
Fig. 19 is a section taken on the line 19—19 of Fig. 17.

In this arrangement the general scheme of circulation is the same as that previously described with respect to Figs. 7 to 10, the direction of flow of oil being indicated by the arrows in Figs. 17 and 19. As shown in these figures, the oil flows in parallel through the several jacket spaces 24 and then passes around the walls of the gas passages, which pass through the portion 26a of the chamber 26, to the jacket spaces 40 in the head by way of ports 138a. After flowing through the jacket spaces 40 of the several cylinder heads, the oil flows to the common outer oil space 32 and from this space flows to the cooler or radiator of the cooling system.

Figure 18:
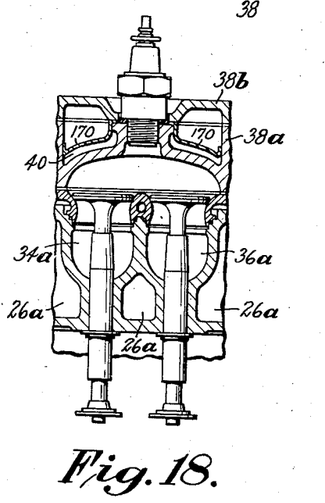
Fig. 18 is a section taken on the line 18—18 of Fig. 17.

In order to insure against leakage of oil from the system, the head parts 38a and 38b are preferably grooved as at 172 and the grooves 172 communicate by way of drain channels 174 with the groove 92 in the lower cylinder casing 10a. The latter groove is connected by a drain, not shown in the figure, with the sump.

Figure 20:
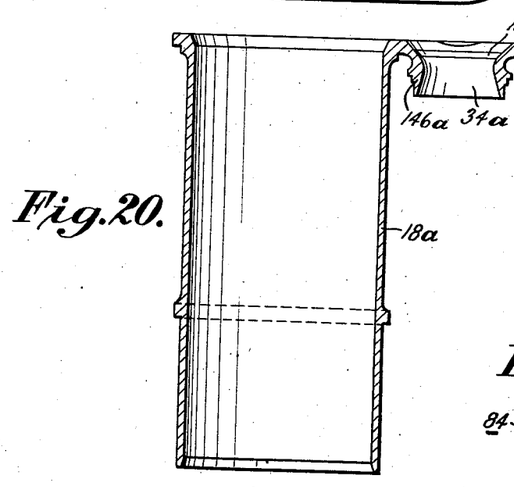
Fig. 20 is a section, on enlarged scale, of a cylinder part shown in Fig. 17.
Figure 21:
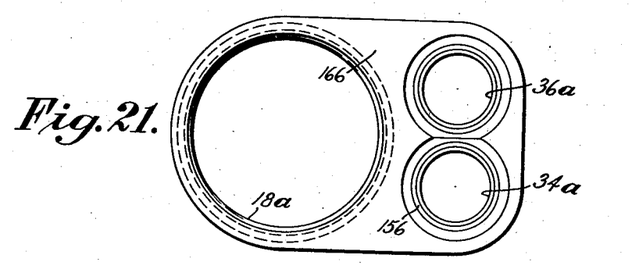
Fig. 21 is a top plan view of the cylinder part shown in Fig. 20.

It will be observed from Figs. 20 and 21 that the cylinder liner 18a with the integrally formed valve seats and branches for the gas passages provides the same general advantages previously pointed out in connection with the separable cylinder head member shown in Figs. 12 to 14, since this part is also relatively light and simple in shape so that it may readily be cast accurately, and the shape of the part further permits substantially the entire surface to be readily machined. The provision of the integral valve seats and branches for the gas passages permits, in the manner already described, the employment of thin walls, and consequently good heat transfer, at the places where most efficient cooling is required and the comparatively small amount of material required permits the use of high grade material not only for the purpose of obtaining durable valve seats but also for the purpose of obtaining durable walls for the barrel portion of the cylinder.

All of the hereinbefore described forms of apparatus are adapted to be employed in the same general type of oil cooling system, that is, a system in which the cooling oil is circulated through a closed path of flow under a certain amount of pressure, which pressure is conveniently and preferably maintained by supplying the cooling system with oil from the lubricating oil system through which oil is ordinarily forced at substantial pressure.

In my previously mentioned application, Serial No. 513,335, a system of this general character is disclosed, in which oil under pressure from the lubricating oil system is supplied through a suitable direct connection to the cooling oil system. In arrangements such as that disclosed in said application the maximum pressure in the cooling oil system is limited by a relief or overflow valve. With this arrangement, the cooling oil system is subjected to substantially the same pressure as the pressure in the lubricating oil system and when the engine is started cold, with the oil in the lubricating system in viscous state, the pressure in the lubricating system frequently rises to a value considerably above normal, thus subjecting the cooling oil system to a relatively high and undesirable pressure. Furthermore, it is desirable to prevent a substantial amount of flow of oil from one system to the other, since it is desirable to circulate the oil in the lubricating system at a lower temperature than is the desirable temperature for the oil circulating in the cooling system. Obviously, with a direct connection between the two systems, a considerable flow from one system to the other may occur under certain conditions, as for example when the pressure in the lubricating oil system is above normal and above the pressure required to open the relief valve in the cooling oil system. This condition would cause the excess pressure in the combined systems to be relieved through the cooling system pressure relief valve, with consequent substantial flow of oil from the lubricating system to the cooling system. Furthermore, it is desirable in many engine designs to circulate the lubricating oil during normal operation of the engine at relatively high pressures and it is obviously undesirable to subject the cooling system, including the relatively thin walled cooling tubes of the radiator, to such high pressures.

In accordance with the present invention, I improve upon prior art constructions by providing a pressure reducing valve in the connection between the lubricating oil system and the cooling oil system, which valve is governed by the pressure existing on the low pressure or cooling oil side of the valve and operates to cut off the supply of oil to the cooling system when the pressure therein reaches a predetermined value. By this means it is possible to operate the lubricating oil system at as high a pressure as may be desired without subjecting the parts of the cooling oil system to a pressure greater than that which may be desired. A valve suitable for this purpose is shown in Fig. 3 at 82 and is illustrated on a larger scale in Fig. 22. In the construction illustrated the valve comprises a main casing 176 having a cylindrical bore vented to the atmosphere at the top by means of the vent 178 and adapted to be connected to the outer cylinder head casing by means of a suitable threaded nipple 180. Loosely mounted in the bore of casing 176 is piston 182 which is closed at its upper end and provided with a plurality of ports 184 adjacent the head of the piston. Between the piston and the upper end of the casing 176 there is disposed the coil spring 186 which it will be noted exerts no force on the piston when the piston is in the lower position shown in Fig. 22. By means of an annular recess 188 in the casing 176, ports 184 are placed in communication with the branch 176a to which is secured the nipple 190. Conduit 76 leading from the lubricating oil system is connected to nipple 190 and the latter provides a seat for a ball check valve 192 held to its seat by spring 194.

The operation of this valve is as follows: If it is assumed that the oil cooling system is empty and the engine is started, oil will be supplied through conduit 76 and will open the check valve and flow through ports 184 and into the cooling oil system, as indicated by the arrows in Fig. 22. This flow is permitted since with the cooling oil system not under pressure, the piston 182 will be in the position shown in the figure. As soon as the system is filled and the pressure rises, the pressure will force the piston 182 upwardly against the action of spring 186 and this action will close ports 184, thus cutting off the further supply of oil under pressure from the conduit 76. As long as the desired pressure is maintained in the oil cooling system, the piston 184 will remain in its upper position but if for any reason the pressure drops below that which is desired, the piston will move down under the influence of spring 186 to admit sufficient additional oil to bring the pressure back to the normal operating pressure. Check valve 192 prevents the return flow from the cooling oil system to the lubricating oil system.

Figure 23:
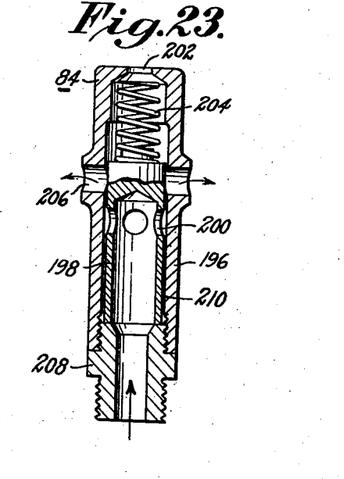

In order to prevent the building up of excess pressure in the oil cooling system, an excess pressure or relief valve is provided, this valve being indicated at 84 in Fig. 3 and being shown on enlarged scale in Fig. 23. This valve comprises a casing 196 having a cylindrical bore in which is located piston 198 closed at its upper end and provided with a plurality of ports 200 adjacent its upper end. The bore in casing 196 is vented to the atmosphere at its upper end through port 202 and a spring 204 is interposed between the piston and the upper end of the casing. Spring 204 imposes no force on the piston 198 when the latter is in its lower position as shown in Fig. 23. Intermediate its ends casing 196 is provided with a plurality of ports 206 adapted to register with ports 200 in the piston when the latter is lifted from its lower position due to pressure in the system. The valve casing 196 is adapted to be connected to the outer head casing by means of a suitable nipple 208. As will be observed from Fig. 23, there is a substantial clearance space 210 between the skirt of piston 198 and the bore of the casing 196 below the level of ports 206. The purpose of this clearance space as well as that provided by the loose mounting of piston 182 in valve 82 will be explained later.

The operation of valve 84 is more or less obvious. As long as the pressure in the oil cooling system remains below a predetermined value, determined by the strength of spring 204, the piston 198 will be held in a position such that ports 200 will remain below ports 206 and upon rise in pressure beyond the predetermined value, these ports will come into registry so as to vent some of the oil and thus relieve the pressure. Preferably, the strength of spring 204 is made such that the pressure at which valve 84 acts as a relief is in excess of the pressure required to close valve 82, so as to insure a range of pressures in the oil cooling system within which a stable condition exists with respect to flow of oil either to or from the cooling system.

The provision of valve 84 is desirable in an oil cooling system of the character described because of the possibility of generation of fixed gases from the oil used in the cooling system, due to the relatively high temperature at which it is desirable to circulate the oil in some parts of the cooling system.

In an oil cooling system of the character described a certain amount of air entrained with the oil is unavoidable and ordinarily it is difficult if not impossible to avoid the formation of a certain quantity of fixed gases from the oil. The presence of uncondensable gases of any character is undesirable in the system since they interfere with the cooling effect obtained and in order to remove such gases from the system means is provided for continuously deaerating the system. This means in the present embodiment is incorporated in the pressure reducing and excess pressure valves which, as will be noted from Fig. 3, are both placed at substantially the highest point in the cooling system in a position such that any air or other gases in the system will collect at the valves. With the system operating at normal pressure both of the valve pistons 182 and 198 will be somewhat above the positions shown in Figs. 22 and 23 and any gases collecting at the valves can pass upwardly through the clearance spaces between the pistons and their respective casings. In the case of the valve shown in Fig. 22, gases will pass completely past the piston and will be vented to atmosphere through the vent 178. In the case of the valve shown in Fig. 23, gases will pass upwardly through the clearance space 210 and out through the relief ports 206.

Due to the restriction provided by the clearance spaces it will be evident that while gases can pass through these spaces the loss of oil from the cooling system due to flow therethrough will be relatively negligible because of the much higher viscosity of the oil.

Figure 22:
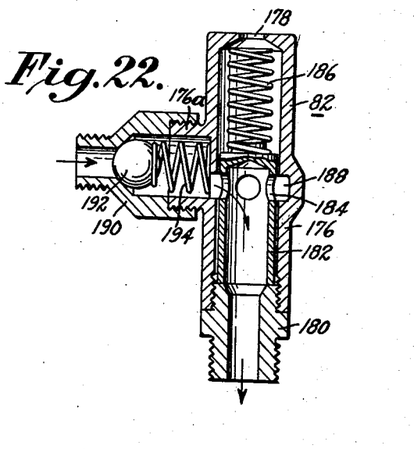
Fig. 22 is a section, on enlarged scale, of a valve arrangement shown in Fig. 3; and, Fig. 23 is a section, on enlarged scale, of another valve arrangement shown in Fig. 3.

It is possible to use the throttling effect of the narrow clearance spaces to prevent excessive flow of oil from the system, while at the same time maintaining a continuously open path of egress of gases, due to the fact that the pistons 182 and 198 have a certain amount of more or less continuous movement during normal operation of the engine which is caused by normal fluctuations in oil pressure in the cooling system. These pressure variations may be caused by different rates of circulation of the oil and also by variations in the viscosity of the oil due to changes in working temperature. The arrangement shown, employing venting spaces around movable pistons or plungers has the advantage as compared with ordinary valves, of providing deaerating channels regardless of whether or not the valve formed by the piston or plunger is open or closed. A further advantage of incorporating the deaerating feature in the pressure reducing valve structure is that substantially immediate deaeration of the oil entering the cooling system from the lubricating system is effected, this oil frequently containing a considerable amount of entrained air.

While for purposes of convenience and simplicity the deaerating feature has in the present embodiment been combined with both the pressure reducing and excess pressure valve structures, it will be evident that separate deaerating valves may be employed and it will further be evident that the desired movement of one of the members of the deaerating apparatus may be effected by means other than variation in oil pressure in the system. In this connection it is to be noted that the inertia of any loosely mounted member will ordinarily result in movement of the member when the apparatus is mounted on an automobile or aircraft engine which is subject to more or less vibration.

From the foregoing description it will be apparent to those skilled in the art that the invention in its several aspects is susceptible of being carried into effect by means of apparatus which may be varied widely in its details of design and it will further be evident that some features of the invention may be employed to the exclusion of others. Thus, for example, it is not essential from the standpoint of certain aspects of the invention that oil for the cooling system be supplied from the pump for circulating oil through the lubricating system of the engine and it will also be understood that the utility of the invention is not restricted to the use of any particular oil as the cooling medium, the term oil being employed herein in its generic sense to designate fluids having the general characteristics of oil with respect to the factors of boiling and freezing points, viscosity and other factors important from the standpoint of engine cooling. Also the term closed circuit cooling system and like terms as employed herein, are intended to include cooling systems of the character hereinbefore described in which a certain amount of the medium circulated in the system may flow therefrom due to leakage or deliberate removal in connection with deaeration and in which fluid is added to replace that which is lost from the system.

What I claim is:

1. In an oil cooling system for internal combustion engines, an integral outer cylinder casing, a plurality of separate cylinder liners mounted in said casing, a plurality of separate sleeves around said cylinder liners, said sleeves providing separate jacket spaces for circulation of oil separately in the form of thin films over substantially the entire area of the several cylinder liners requiring cooling and said outer casing providing an outer chamber for oil in communication with said jacket spaces for supplying oil to the jacket spaces and for receiving oil therefrom, said chamber being divided into inlet and outlet parts and said jacket spaces each being in communication with each of said parts so as to cause flow of oil from the inlet part to the outlet part of said chamber in separate streams flowing in parallel through the different jacket spaces.

2. In an internal combustion engine, an oil cooling system for circulation of cooling oil in a closed path of flow comprising outer cylinder casing parts, inner cylinder parts separable from said outer casing parts and from each other, additional separable parts located within the outer casing parts closely adjacent to the cylinder parts, said additional separable parts cooperating with the inner cylinder parts to form jacket spaces for flow of cooling oil over the major portion of the area of the inner cylinder parts in the form of thin films at high velocity, said casing parts providing a reservoir space for cooling oil around said jacket spaces having substantially greater volume than that of said jacket spaces and in communication therewith and conduits for conducting oil to and withdrawing oil from the space in the outer casing parts.

3. In an internal combustion engine, the combination with an inner cylinder part requiring cooling, of a cooling system employing positively circulated oil as a cooling agent, said system comprising parts defining a closed path of flow for the oil and including a part defining with said inner cylinder part a jacket space having closely adjacent walls for limiting the oil flowing over the part to be cooled to a thin film, said jacket space being formed to create turbulence of flow in the film of cooling oil, and means for forcing the cooling oil through said jacket space at high velocity.

4. In an internal combustion engine, the combination with an inner cylinder part requiring cooling, of a cooling system employing positively circulated oil as a cooling agent, said system comprising parts defining a closed path of flow for the oil and including a part defining with said inner cylinder part a jacket space having closely adjacent walls for limiting the oil flowing over the part to be cooled to a thin film, said walls comprising a corrugated surface for creating turbulence of flow in the film of cooling oil, and means for forcing the cooling oil through said jacket space at high velocity.

5. In an internal combustion engine of the side valve type, an oil cooling system for circulation of oil in a closed circuit comprising an outer lower cylinder casing and a separate inserted inner cylinder part adapted to be cooled by oil, said part comprising a cylinder barrel portion and portions integral with said barrel portion and offset therefrom providing inlet and exhaust passages for flow of gas to and from the cylinder, there being space between said portions and said casing for flow of cooling oil between said part and said casing and means for causing flow of oil therethrough.

6. In an internal combustion engine, an oil cooling system for circulation of oil in a closed circuit comprising an outer casing and a separate inserted inner cylinder part adapted to be cooled by oil, said part comprising a wall portion exposed to combustion gases within the cylinder and portions integral with said wall portion providing inlet and exhaust passages for flow of gas to and from the cylinder, said portions being provided with stiffening ribs or flanges to permit such portions to be of minimum thickness, whereby to effect efficient heat transfer therethrough, and there being space between said casing and said part for flow of cooling oil over said part in the form of thin films, and means for forcing oil through said space at high velocity.

7. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system and means in said connection for closing the same when the pressure in the cooling oil system reaches a predetermined value.

8. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system and a valve in said connection adapted to be closed by pressure in the cooling oil system to prevent flow of oil from the lubricating oil system to the cooling oil system when the pressure in the latter system reaches a predetermined value.

9. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system, a valve in said connection adapted to be closed by pressure in the cooling oil system to prevent flow of oil from the lubricating oil system to the cooling oil system when the pressure in the latter system reaches a predetermined value, and a check valve in said connection for preventing flow of oil from the cooling oil system to the lubricating oil system.

10. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system, a valve in said connection adapted to be closed by pressure in the cooling oil system to prevent flow of oil from the lubricating oil system to the cooling oil system when the pressure in the latter system reaches a predetermined value, and a valve for relieving excess pressure in the cooling oil system.

11. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system, a valve in said connection adapted to be closed by pressure in the cooling oil system to prevent flow of oil from the lubricating oil system to the cooling oil system when the pressure in the latter system reaches a predetermined value and a valve for relieving excess pressure in the cooling oil system, the valve in said connection being adapted to close the same at a pressure lower than the pressure at which the second mentioned valve opens to relieve pressure in the oil cooling system.

12. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system and a valve in said connection for preventing flow of oil therethrough when the pressure in the cooling oil system reaches a predetermined value, said valve being located at a high point in the cooling system where gases collect and providing a restricted passage for flow of fluid from the oil cooling system, whereby to effect deaeration of the oil in the cooling system.

13. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system and a valve in said connection for preventing flow of oil therethrough when the pressure in the cooling oil system reaches a predetermined value, a pressure relief valve for preventing excess pressure in the cooling oil system, said valves being located at high points in the cooling oil system where gases collect and providing restricted passages for flow of fluid from the oil cooling system, whereby to effect deaeration of the oil in the cooling system.

14. In an internal combustion engine having a lubricating oil system for circulation of lubricating oil under pressure and a cooling oil system for circulation of cooling oil under pressure in a closed circuit separate from the lubricating oil system, a connection for supplying oil from the lubricating system to the cooling system and means for deaerating the oil entering the cooling system from the lubricating system.

15. In an internal combustion engine having a lubricating oil system for circulation of lubricating oil under pressure and a cooling oil system for circulation of cooling oil in a closed circuit separate from the lubricating oil system and under pressure in excess of that required for circulation of the cooling oil through the circuit, a connection for supplying oil from the lubricating system to the cooling system and for establishing such excess pressure in the cooling system due to the pressure maintained in the lubricating system and means comprising a restricted passage for continuous removal of fluid from the cooling oil system adjacent the oil entrance thereto for deaerating the oil therein while maintaining such excess pressure, said means being located at a high point in the system where gases collect.

16. In an internal combustion engine having a lubricating oil system for circulation of lubricating oil under pressure and a cooling oil system for circulation of cooling oil in a closed circuit separate from the lubricating oil system, and under pressure in excess of that required for circulation of the cooling oil through the circuit, a connection for supplying oil from the lubricating system to the cooling system and for establishing such excess pressure in the cooling system due to the pressure maintained in the lubricating system and means comprising a restricted passage for continuous removal of fluid from the cooling oil system adjacent the oil entrance thereto for deaerating the oil therein while maintaining such excess pressure, said means being located at a high point in the system where gases collect and said passage being proportioned to permit relatively free escape of gas therethrough while offering substantial resistance to flow of oil therethrough.

17. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system and means for deaerating the oil in the cooling oil system comprising parts located at a high point in the system where gases collect, said parts having a relatively narrow clearance space therebetween providing a restricted passage for flow of fluid from the cooling oil system and one of said parts being movable relative to the other, whereby to assist in keeping said clearance space free for flow of fluid therethrough.

18. In an internal combustion engine having a lubricating oil system for circulation of lubricating oil under pressure and a cooling oil system for circulation of cooling oil in a closed circuit separate from the lubricating oil system, a connection for supplying oil from the lubricating oil system to the cooling oil system, and means for deaerating the oil in the cooling oil system comprising parts located at a high point in the system where gases collect, said parts having a relatively narrow clearance space therebetween providing a restricted passage for flow of fluid from the cooling oil system and one of said parts being movable under the influence of variations in pressure of oil within the cooling oil system.

19. In an internal combustion engine, means providing a crankcase forming a reservoir for lubricating oil, a cylinder block comprising an outer casing and a cylinder barrel and providing a cooling jacket space around said barrel, a removable cylinder head providing a jacket space communicating through the joint between said head and said block with the first mentioned jacket space, a double joint between said casing and said head comprising spaced inner and outer joint surfaces located outwardly of the place of communication between said jacket spaces, a drain conduit placing the space between said surfaces in communication with said reservoir, and means for circulating through said jacket spaces oil of the same kind as that contained in said reservoir.

20. In an internal combustion engine having an oil cooling system, outer casing means enclosing the engine cylinders and providing space for cooling oil for the cylinders, rigid metal conduits for flow of oil to and from said space, said conduits being rigidly secured to said casing means, a double joint between said casing means and said conduits comprising spaced perimetral inner and outer joint surfaces and means for draining oil from the space between said surfaces to a place within the engine, whereby to prevent leakage of oil to the exterior of the engine at said joints.

21. In an internal combustion engine having a cylinder requiring cooling, an oil cooling system providing for circulation of oil for cooling said cylinder including separable members providing walls defining a jacket space surrounding said cylinder, said walls being spaced apart by a distance falling within a range of values of which the lower limit is substantially $\frac{1}{32}$nd of an inch and of which the upper limit is approximately $\frac{1}{8}$ of an inch, whereby to provide for flow of oil through said jacket space in the form of a thin film, and means for forcing oil through said jacket space at high velocity.

22. In a multi-cylinder internal combustion engine, an oil cooling system providing for flow of oil in a closed circuit under pressure including parts providing jacket spaces for flow of oil in the form of thin films over the major portions of the wall surface of the cylinders which require cooling, said circuit including means for dividing the oil into a plurality of streams flowing in parallel with respect to each other, each stream flowing over a different cylinder and means for forcing oil through said jacket spaces at high velocity, the parts forming the jacket spaces being constructed and arranged to cause the films of oil to flow at different velocities over different portions of the cylinders in accordance with the different rates of cooling required for the different portions of the same cylinder.

23. In an internal combustion engine, an oil cooling system for circulation of oil in a closed circuit comprising an outer cylinder head casing and a separate inserted inner cylinder head part adapted to be cooled by oil, said part including a wall portion exposed to combustion gases within the cylinder and portions integral with said wall portion providing inlet and exhaust passages for flow of gas to and from the cylinder, said outer casing providing a reservoir space for oil and said inner cylinder head part cooperating with a portion of the outer cylinder head casing to form jacket space between said portions of the inner cylinder head part and walls of the outer casing for flow of cooling oil over said portions of the inner part in the form of thin films, said jacket space being in communication with the reservoir space, and means for forcing oil through said jacket space at high velocity.

24. In an internal combustion engine, an oil cooling system for circulation of oil in a closed circuit comprising an outer cylinder head casing and a separate inserted inner cylinder head part adapted to be cooled by oil, said part including a wall portion exposed to combustion gases within the cylinder and portions integral with said wall portion providing inlet and exhaust passages for flow of gas to and from the cylinder, there being valve seats in said part between said wall portion and the last mentioned portions, said outer cylinder head casing having walls forming a reservoir space and said portions of said inner cylinder head part cooperating with walls of the outer cylinder head casing part to provide jacket space in communication with said reservoir space, said jacket space limiting flow of oil over said portions of the inner cylinder head part in the form of thin films, and means for forcing oil through said jacket space at high velocity.

25. In an internal combustion engine, an oil cooling system for circulation of oil in a closed circuit under pressure comprising a detachable cylinder head including an outer cylinder head casing and a separate inserted cylinder head part, said outer casing having walls providing a reservoir space for oil, said inner part including a wall portion exposed to combustion gases within the cylinder and portions integral with said wall portion providing inlet and exhaust passages for flow of gas to and from the cylinder, there being valve seats in said inner part between said wall portion and the last mentioned portions and the joint between the last mentioned portions and the outer casing being located on the side of the valve seats away from the combustion chamber of the cylinder, the aforesaid portions of the inner part cooperating with walls of the outer casing to provide jacket space for flow of oil in the form of thin films over said portions, said jacket space being in communication with said reservoir space, and means for forcing oil under pressure at high velocity through said jacket space.

26. In an internal combustion engine, an oil cooling system for circulation of oil in a closed circuit under pressure comprising an outer lower cylinder casing, a detachable cylinder head including an outer cylinder head casing and separate inserted inner cylinder barrel and cylinder head parts in said casings forming an engine cylinder, said cylinder head part comprising portions providing inlet and exhaust passages for flow of gas to and from the cylinder and said portions having joints between them and the outer cylinder head casing, said outer cylinder head casing and said inner cylinder head part providing a detachable cylinder head removable from the lower cylinder parts, the inner cylinder barrel part cooperating with means in the outer lower cylinder casing to provide a jacket space for flow of oil in the form of thin films over the cylinder barrel part, the inner cylinder head part cooperating with portions of the outer cylinder head casing to form a second jacket space for flow of oil over the inner cylinder head part in the form of thin films, said jacket spaces being in communication, said parts being arranged within said casings so that said joints are compressed when the cylinder head casing is secured to the lower cylinder head casing, and means for forcing oil through said jacket spaces at high velocity.

27. In an internal combustion engine, a lubricating system including a reservoir for oil and an oil cooling system for circulation under pressure in a closed circuit of oil of the same kind as used for lubrication, said cooling system comprising parts exposed to pressure of oil in the cooling system and separable at a joint terminating at the exterior of the engine, said joint being a double joint comprising spaced inner and outer packing surfaces, the inner surfaces being subjected to pressure of oil in the cooling system and a drain conduit placing the space between the inner and the outer packing surfaces in communication with said reservoir, whereby to prevent leakage of oil from the cooling system to the exterior of the engine and to return oil leaking past the inner packing surfaces to said reservoir.

28. In an internal combustion engine, a lubricating system including a reservoir for oil and an oil cooling system for circulation under pressure in a closed circuit of oil of the same kind as used for lubrication, said cooling system comprising a stationary part and a moving part exposed to pressure of oil in the system and double packing means between said parts comprising spaced inner and outer packing means, a spring between said means for exerting pressure on said packing and a drain conduit placing the space between said packing means in communication with said reservoir for preventing leakage of oil to the exterior of the engine from said cooling system and for returning leakage past said packing means to said reservoir.

29. In an internal combustion engine, a lubrication system, an oil cooling system, said oil cooling system including a built up cylinder block comprising an outer casing having mounted therein a plurality of cylinders, a removable cylinder head, a double joint between said casing and said head comprising spaced inner and outer surfaces extending around the perimeter of the joint, said lubricating system having a reservoir for oil, passages for conducting the cooling oil leaking past said inner surface from the cooling system from the space between said surfaces to said reservoir, and means for circulating through the cooling system oil of the same kind as that in the lubricating system.

30. In an internal combustion engine, an oil cooling system for circulation of oil in a closed path of flow including a cylinder head casing detachable from the cylinder with which it cooperates and having a combustion chamber wall portion, said casing comprising upper and lower castings detachably secured together and forming between them a space of substantial volume for cooling oil, and a part within said casing dividing said space into a jacket space and a reservoir space, said jacket space being formed between said part and said combustion chamber wall portion and having closely adjacent walls for circulation of cooling oil in the form of a thin film over said wall portion, said jacket space and said reservoir space being in communication and said reservoir space having a volume several times that of the jacket space.

FREDRIK LJUNGSTRÖM.